Figure 1:
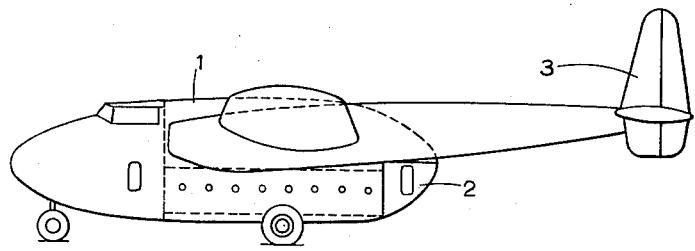

Sept. 4, 1956  H. BRUMBY ET AL  2,761,637
COMPOSITE SECTIONAL STAIRWAY AND
DOORWAY ARRANGEMENT FOR AIRCRAFT
Filed May 19, 1953  7 Sheets-Sheet 1

Harold Brumby
Dennis Stokes Warburton
INVENTORS

By

ATTORNEYS

Sept. 4, 1956

H. BRUMBY ET AL 2,761,637

COMPOSITE SECTIONAL STAIRWAY AND
DOORWAY ARRANGEMENT FOR AIRCRAFT

Filed May 19, 1953

7 Sheets-Sheet 3

Harold Brumby
Dennis Stokes Warburton
INVENTORS

By

ATTORNEYS.

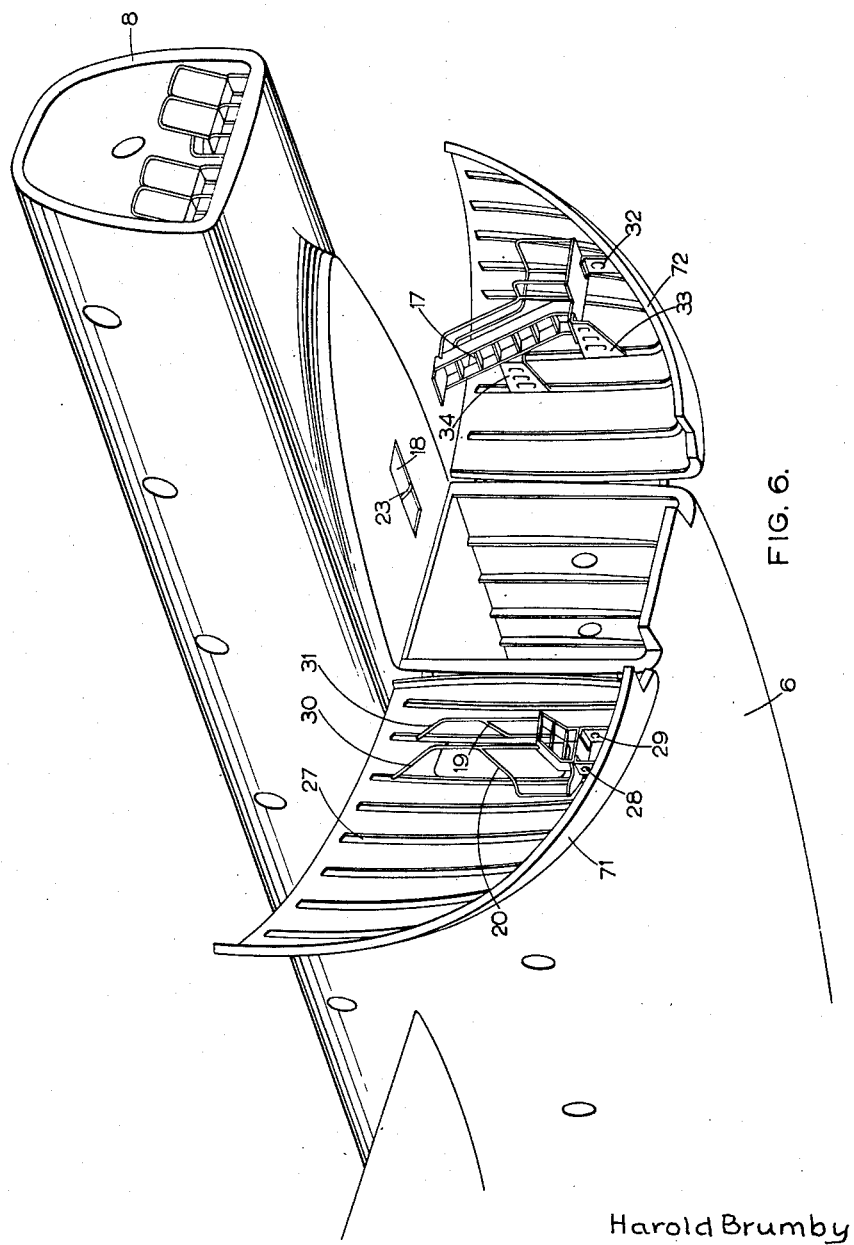

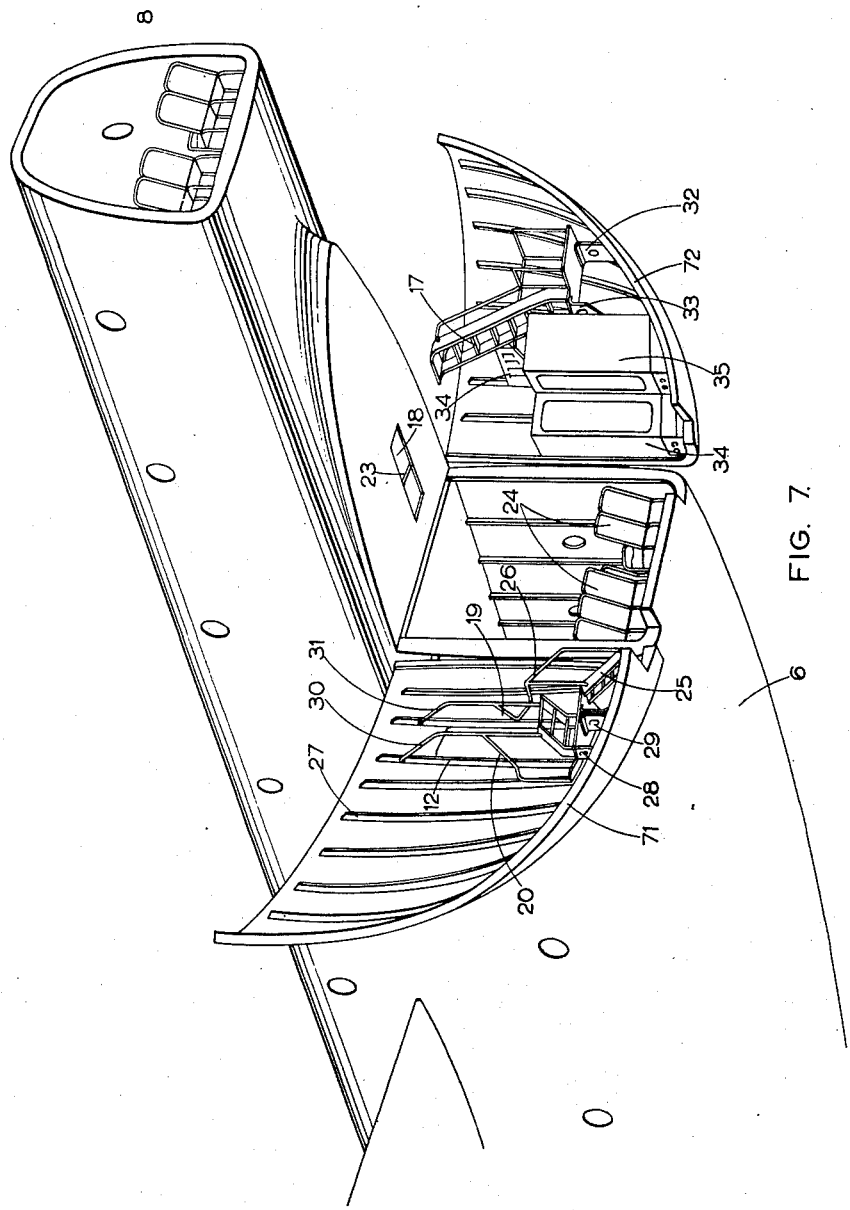

Sept. 4, 1956 H. BRUMBY ET AL 2,761,637
COMPOSITE SECTIONAL STAIRWAY AND
DOORWAY ARRANGEMENT FOR AIRCRAFT
Filed May 19, 1953 7 Sheets-Sheet 6

Harold Brumby
Dennis Stokes Warburton
INVENTORS
By
ATTORNEYS

Sept. 4, 1956    H. BRUMBY ET AL    2,761,637
COMPOSITE SECTIONAL STAIRWAY AND
DOORWAY ARRANGEMENT FOR AIRCRAFT
Filed May 19, 1953    7 Sheets-Sheet 7

Harold Brumby
Dennis Stokes Warburton
INVENTORS

By

ATTORNEYS

United States Patent Office 2,761,637
Patented Sept. 4, 1956

2,761,637
COMPOSITE SECTIONAL STAIRWAY AND DOORWAY ARRANGEMENT FOR AIRCRAFT

Harold Brumby, Elloughton Brough, and Dennis Stokes Warburton, Brough, England, assignors to Blackburn and General Aircraft Limited, Brough, England, a British company Application May 19, 1953, Serial No. 355,962
Claims priority, application Great Britain May 21, 1952

6 Claims. (Cl. 244—118)

This invention relates to improvements in aircraft and is particularly concerned with larger sizes of aircraft intended to carry either mixed loads of freight and passengers or passengers only.

Such aircraft have accommodation for passengers in an upper compartment with a freight compartment therebelow and when such aircraft is required to be used for carrying passengers only, they are accommodated also in the freight compartment on removable chairs.

Of necessity such aircraft have large, deep fuselages in order to provide adequate space for the freight and to facilitate the loading and unloading of such cargo space it is nowadays customary to provide what are known as clam-shell type doors which, when open, afford unrestricted access to the cargo space and, when closed, fair off or make up the continuity of the surface of the fuselage.

A difficulty with such aircraft is that, in order to provide access for the passengers to the passenger compartment a high rising stairway must be brought up to the aircraft and maneuvered to reach an access door in the fuselage or else it is necessary to provide an internal stairway which reduces the available space in the freight compartment.

Now the object of the present invention is to provide an aircraft designed for carrying a mixed load of freight and passengers but which is also capable of carrying passengers alone in which the use of a high rising external staircase or any reduction in the cargo space is avoided.

To this end, according to the present invention, an aircraft having a passenger compartment situated above a compartment normally intended to accommodate freight and which is closed off at one end by a pair of clam-shell type doors has an internal stairway giving access to the passenger compartment constructed part in one and the remainder in the other of the clam-shell type doors which give access to the freight compartment.

This arrangement is particularly beneficial as it extends the possibilities of utilization of the aircraft as the arrangement may be such that, in addition to the stairway leading to the passenger compartment, an additional stairway, or landing may be provided to enable the passengers to enter directly into the freight compartment when the same is furnished with seats. A passenger entrance door is provided in one of the clam-shell type doors and the arrangement is such that the stairway is in operative position when the clam-shell doors are closed.

Normally the clam-shell doors do not carry any structural load but yet their design is such that when closed they will carry the strains of passengers entering and leaving the aircraft particularly as, at that time, the aircraft is on the ground.

In order that the invention may be clearly understood and readily carried into effect, certain embodiments thereof are by way of example hereinafter more fully described with reference to the accompanying drawings which are given by way of example only and not of limitation.

Figure 2:
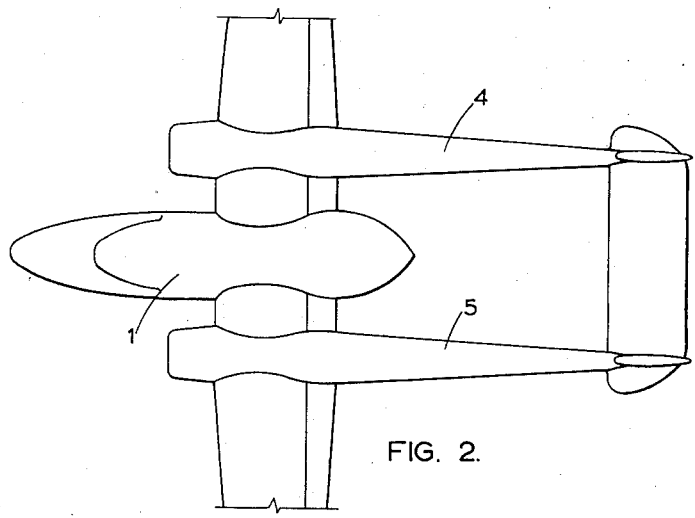
Figure 3:
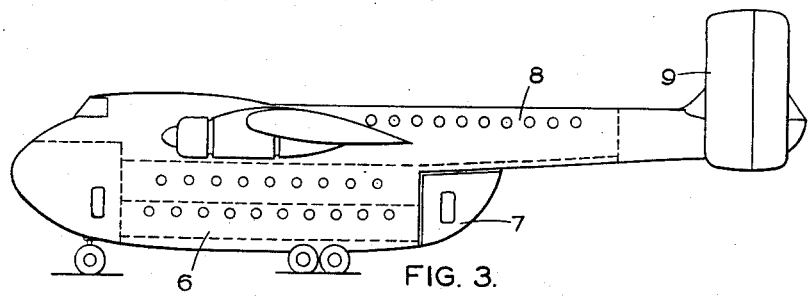

In these drawings:

Fig. 1 is a side elevation of an aircraft having a fuselage containing a passenger compartment situated above a freight compartment and the tail unit carried by twin booms, Fig. 2 is a plan view looking down on Fig. 1 with the tips of the wings omitted, Fig. 3 is a side elevation of another construction of aircraft having a deep fuselage containing a freight compartment with passengers normally accommodated in a tail carrying boom situated above and partly over the freight compartment in the fuselage.

Figure 4:
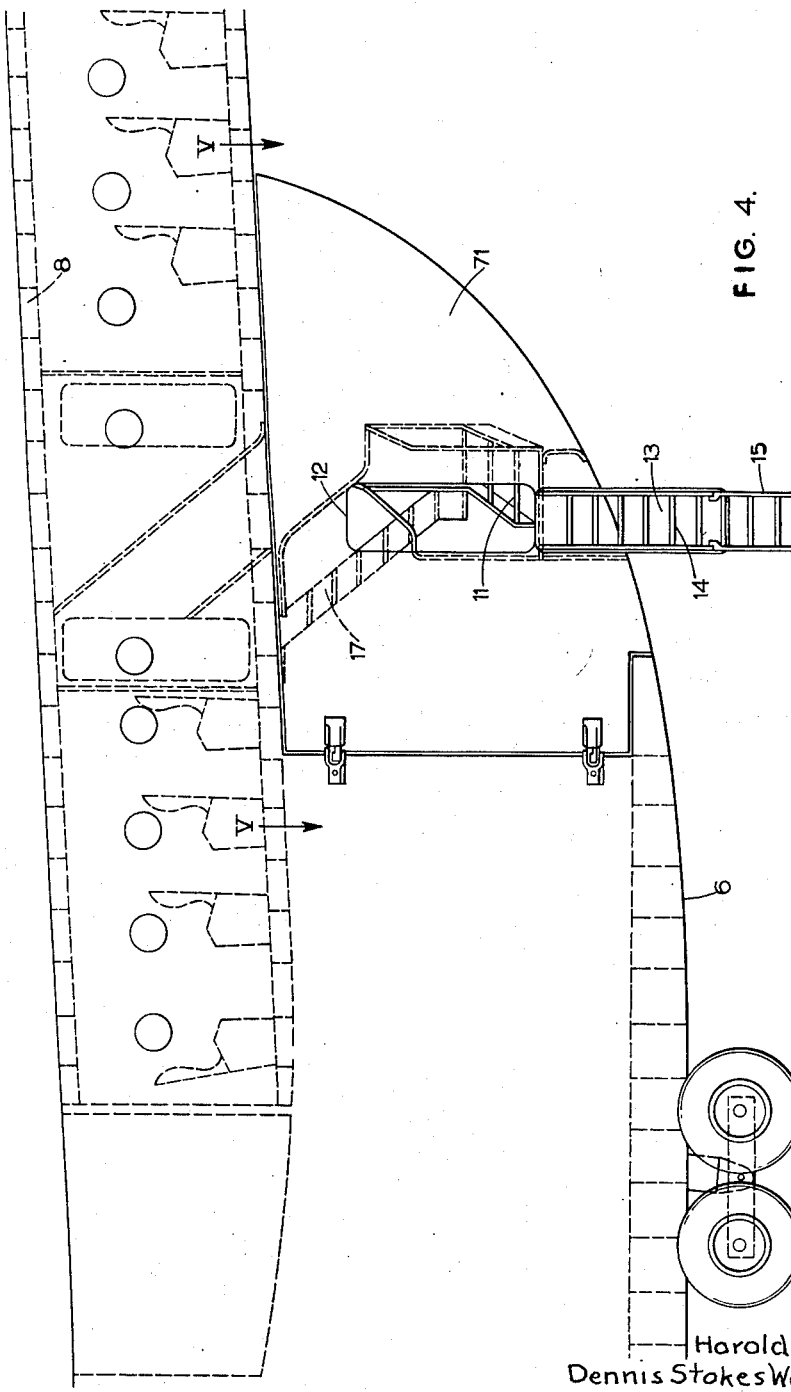
Figure 5:
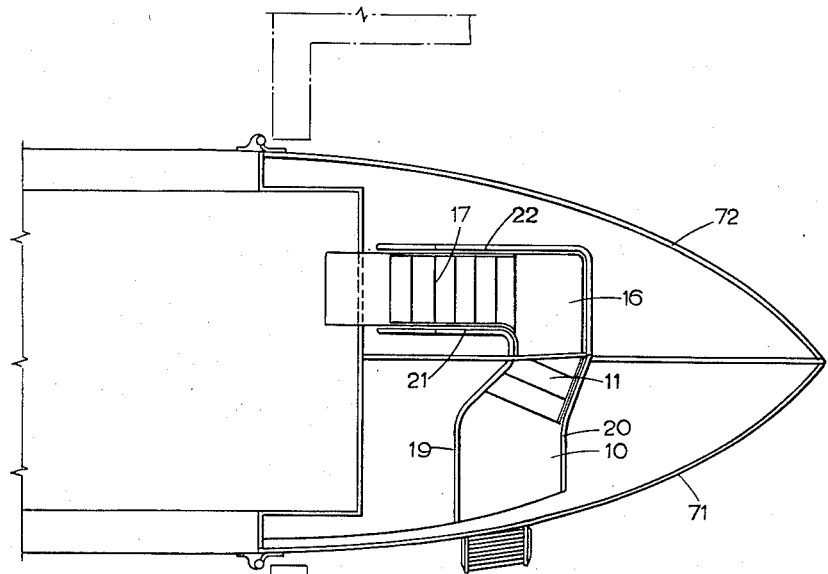
Figure 8:
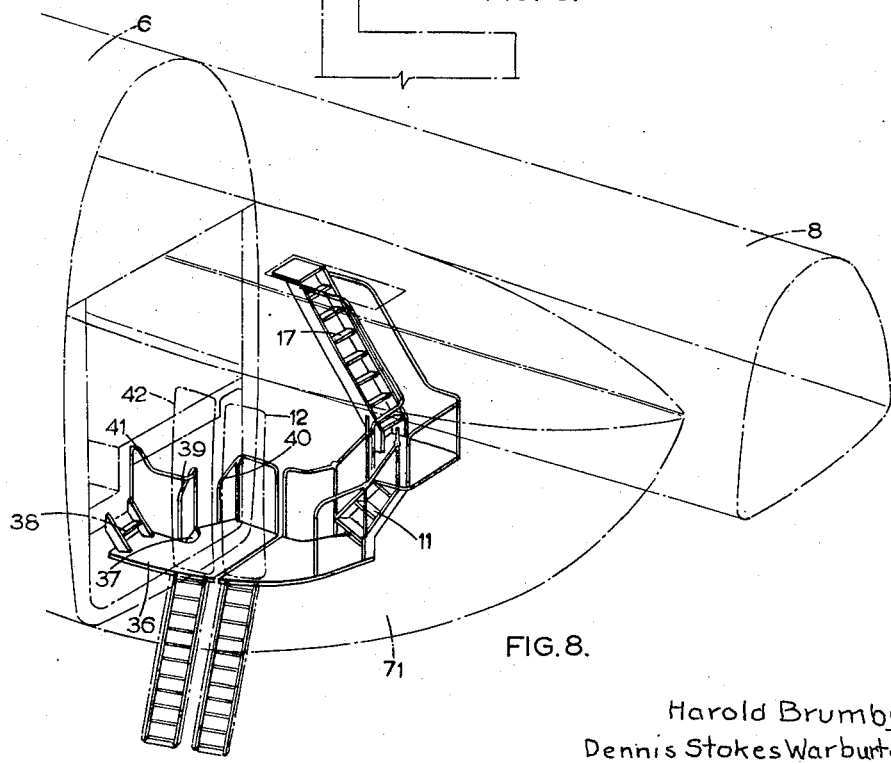
Figure 9:
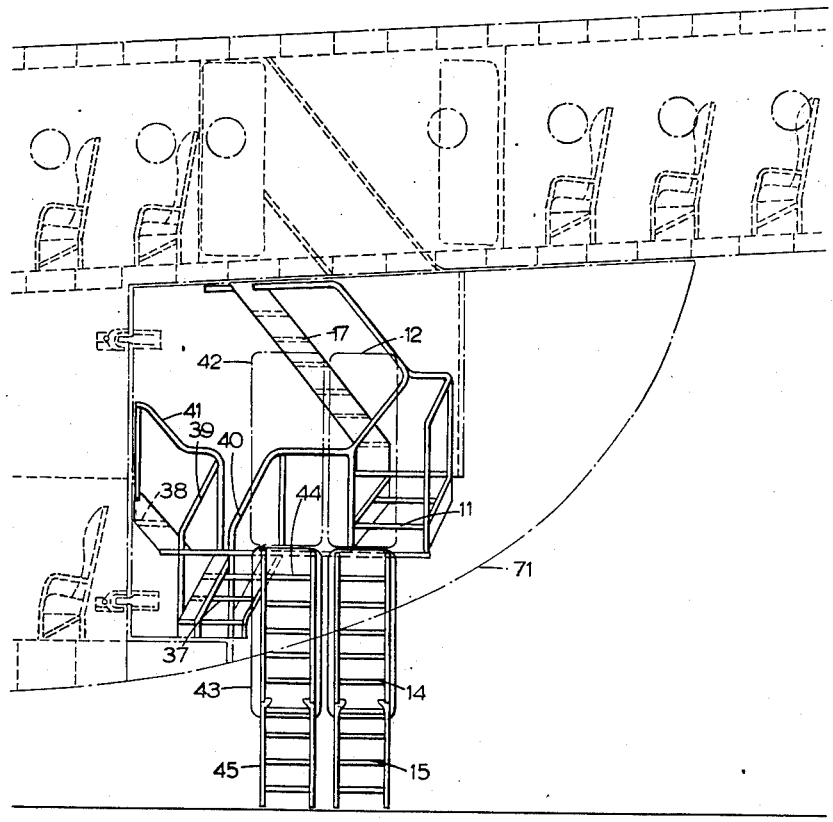
Figure 10:
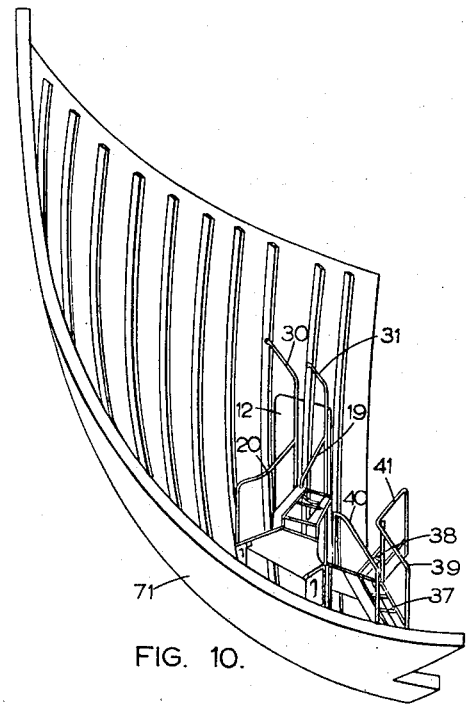
Figure 11:
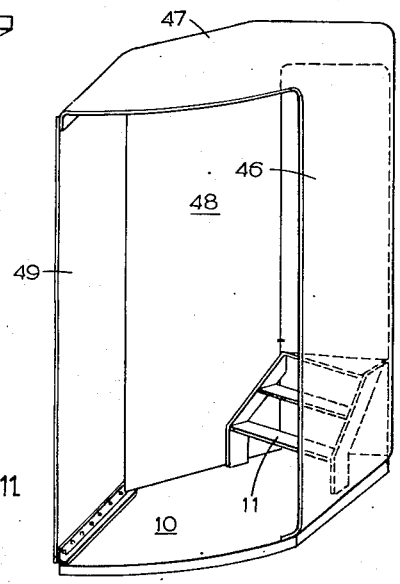

Fig. 4 is a side elevation on an enlarged scale of the rear end of the fuselage of the aircraft illustrated in Fig. 3, Fig. 5 is a cross section on the line V—V of Fig. 4, Fig. 6 is a perspective view of such rear portion of the fuselage with the clam-shell doors shown open, Fig. 7 is a view similar to Fig. 6 showing an additional stair unit, for use when passengers are accommodated also in the freight compartment, Fig. 8 is a perspective view of a stairway construction for use when passengers are also carried in two tiers in the freight compartment of the aircraft which is indicated by chain lines, Fig. 9 is a side elevation of the stairway construction of Fig. 8, Fig. 10 is a view of an open clam-shell door showing the part of the stairway therein of the stair construction shown in Figs. 8 and 9, and Fig. 11 is a perspective view of portion of the stairway in the one clam-shell door showing how the same may be encased.

Referring now to the said drawings, the invention is broadly applicable to all types of aircraft having a passenger compartment situated above a freight compartment. An example of such an aircraft is illustrated in Figs. 1 and 2 when the aircraft has a fuselage 1, with a passenger compartment in the upper part thereof and a freight compartment therebelow which is closed off at the rear by a pair of clam-shell doors 2, which, when open, give unrestricted access to the freight compartment. In the aircraft illustrated, the tail unit 3 is carried by twin booms 4, 5.

Another form of aircraft is illustrated in Fig. 3 comprising a fuselage 6, containing a freight compartment closed off the rear by a pair of clam-shell doors 7 with passengers accommodated in a compartment within a boom 8 disposed above and partly over the fuselage proper, this boom carrying the tail unit 9 and clam-shell doors serving to fair the fuselage into such boom.

Now in accordance with the invention, as illustrated in Figs. 4, 5 and 6, the one clam-shell door 71 carries mounted internally therein a landing 10 from which rises steps 11 which extend as far as the division between the two clam-shell doors. This clam-shell door 71 is also provided with a passenger entry doorway which is conveniently closed by a down swinging door 13 internally provided with steps 14 and having a hinged extension 15 of steps which will reach the ground.

The other clam-shell door 72 has a complementary stairway portion mounted internally therein and comprising a landing 16 and steps 17 in an arrangement such that the steps 11 lead to such landing 16 and the steps 17 lead to the passenger entry 18 through the floor of the passenger compartment in the tail carrying boom 8. Hand rails 19, 20 are provided on each side of the landing 10 and steps 11 and further hand rails 21, 22 are provided on each side of the landing 16 and steps 17, which latter hand rails appear as continuation of the hand rails 19, 20 when the clam-shell doors 71, 72 are closed. A further hand rail 23 in the passenger compartment forms a continuation of the hand rail 22.

In this way, for a passenger to reach the passenger compartment, he enters through a doorway 12, and passes up the steps 11, onto the landing 16 and up the steps 17 into the passenger compartment.

On occasion it may be required to carry passengers also in the freight compartment on removable chairs 24 in which case as illustrated in Fig. 7 the clam-shell door 71 is also provided with down going steps 25 protected by hand rail 26, these steps 25 leading from a landing portion co-extensive with the landing 10 down to the level of the floor of the freight compartment.

In this embodiment as well as that previously described the complementary stairway portions carried by the respective clam-shell doors 71, 72 are carried by suitable supporting brackets connected to stiffening ribs 27 on the inside of the clam-shell doors, thus the portion of the stairway in the door 71 is mounted on brackets 28, 29 with the steps 11 additionally strengthened by extending the risers of the hand rails 19, 20 upwardly and outwardly as at 30 and 31 to be affixed at their ends to the stiffening ribs adjacent the passenger entry doorway 12. Similarly the stairway portion in the clam-shell door 72 is supported on brackets 32, 33 and 34. It should also be noted in Fig. 7 that the space below the steps 17 may accommodate toilet compartments 35, 36.

Owing to the depth of the fuselage of the aircraft illustrated, the height of the freight compartment is such that passengers could be accommodated in two tiers in which case, as illustrated in Figs. 8, 9 and 10, the clam-shell door 71 is provided with an additional stairway unit comprising a landing portion 36 with down going steps 37, corresponding to the steps 25, and leading to the level of the floor of the freight compartment and up-going steps 38 lead to the level of the walk-way of the upper tier of passenger seats in the freight compartment. In this arrangement, hand rails 39, 40 protect down-going steps 37 whilst a hand rail 41 protects up-going steps 38.

In this arrangement, the clam-shell door 71 is conveniently provided with a second passenger doorway 42 with a similar down-swinging door 43 with steps 44 corresponding to the steps 14 with extension steps 45 corresponding to the steps 15. In this way passengers for the passenger compartment in the boom 8 enter through the right hand doorway and pass up the steps 11 and the further steps 17, whilst passengers to be accommodated in the freight compartment enter through the doorway 42 and either pass up the steps 38 or down the steps 37.

It will be appreciated that in the embodiment last described, the additional stairway unit in the clam-shell door may be removable and only positioned in the clam-shell door when required.

In some cases it may be of advantage to encase the landing 10 and steps 11, for example as shown in Fig. 11, when a panel 46 extends up at one end of the steps 11 across thereover at 47 with a panel 48 at the other end of the steps 11, the structure being completed by a panel 49 which may be removable to permit positioning of the additional stairway units as in the two embodiments last described.

We claim:

1. In an aircraft having a passenger compartment above a freight compartment normally closed off by a pair of clam-shell doors, a passenger entry doorway and door positioned in a first one of the said clam-shell doors and an internal stairway leading from said passenger entry doorway to said passenger compartment and positioned partly in and attached to said first one of said clam-shell doors and the remainder positioned in and attached to the second of said clam-shell doors.

2. An aircraft passenger entry and stairway arrangement as claimed in claim 1, in which the first stairway part in said first clam-shell door provided with the passenger entry doorway comprises a landing internally of said doorway and rising steps extending up from said landing and the second stairway part in said second clam-shell door comprises a landing and rising steps, the uppermost step of said first stairway abutting the landing of the second stairway when said clam-shell doors are closed and when the uppermost step of said second stairway opens into said passenger compartment.

3. An aircraft passenger entry and stairway as set forth in claim 1, wherein the door in said doorway is hingedly attached to said one clam-shell door for downward swinging movement and provided internally with steps.

4. In an aircraft arrangement as claimed in claim 2, in which seats are also provided in the freight compartment, an additional stairway provided in and attached to said first clam-shell door with steps leading down from said landing to the level of the floor of the freight compartment.

5. In an aircraft arrangement as claimed in claim 2, in which passenger seats are also provided in the freight compartment in lower and upper tiers, an additional stairway provided in and attached to said first clam-shell door with steps leading from said landing to the floor of the freight compartment on which said lower tier is provided and further steps leading up to said upper tier of seats.

6. In an aircraft having a passenger compartment above a freight compartment, said freight compartment being provided with an opening affording entry thereinto, a pair of co-operating clam-shell doors normally closing off said opening in said freight compartment, a first one of said clam-shell doors being provided with a doorway opening therein to permit entry of passengers therethrough to the interior of said aircraft, and a door normally closing off said doorway opening, an improved stairway arrangement which permits passengers who enter through said doorway opening in said first one of said clam-shell doors to pass upwardly into the passenger compartment of said aircraft, which comprises: a passenger stairway constructed partly in and attached to said first one of said clam-shell doors, the remainder thereof being constructed in and attached to a second of said clam-shell doors, the portion of said stairway that is constructed in said clam-shell door in which said passenger entry doorway is provided comprising a landing portion internally of said entry doorway, and rising steps of which the top step is complementary to a landing portion constructed in and attached to said second clam-shell door; there being constructed in said second clam-shell door said complementary co-operating landing portion, and a stairway rising therefrom which leads to and opens into said passenger compartment of said aircraft; whereby a passage for passengers from said entry doorway into said passenger compartment is provided when said clam-shell doors are in the closed position wherein said freight compartment is closed off.

References Cited in the file of this patent

UNITED STATES PATENTS

| 1,508,604 | Leathers | Sept. 16, 1924 |
| 1,523,715 | Rachbauer | Jan. 20, 1925 |
| 2,268,009 | Babb et al. | Dec. 30, 1941 |
| 2,404,195 | Schlieben | July 16, 1946 |
| 2,453,937 | Ray | Nov. 16, 1948 |
| 2,531,263 | Fink et al. | Nov. 21, 1950 |
| 2,558,975 | Moreno et al. | July 3, 1951 |

FOREIGN PATENTS

| 262,994 | Great Britain | Dec. 23, 1926 |

OTHER REFERENCES

"The Inside Story of the Fairchild Packet," publication of Fairchild Aircraft Division of Fairchild Engine & Airplane Corp., Hagerstown, Maryland; received in the Patent Office February 15, 1947.